United States Patent [19]

Rodgers et al.

[11] 3,979,102

[45] Sept. 7, 1976

[54] ELECTROFLUID CONVERTER

[75] Inventors: Aubrey Rodgers, Huntsville; Rayburn K. Widner, Arab, both of Ala.

[73] Assignee: The United States of America as represented by the Secretary of the Army, Washington, D.C.

[22] Filed: Aug. 22, 1975

[21] Appl. No.: 606,818

[52] U.S. Cl. .................................. 251/11; 236/68 R
[51] Int. Cl.$^2$ .......................................... F16K 31/02
[58] Field of Search ................ 251/11; 236/68 R, 87

[56] References Cited

UNITED STATES PATENTS

| | | | |
|---|---|---|---|
| 2,749,934 | 6/1956 | Nester | 251/11 X |
| 3,005,896 | 10/1961 | Whinery | 236/68 R |
| 3,239,189 | 3/1966 | Ray | 236/68 R |
| 3,270,756 | 9/1966 | Dryden | 236/68 R |

FOREIGN PATENTS OR APPLICATIONS

| | | | |
|---|---|---|---|
| 40,094 | 7/1954 | Germany | 251/11 |

*Primary Examiner*—Arnold Rosenthal
*Attorney, Agent, or Firm*—Nathan Edelberg; Robert P. Gibson; Freddie M. Bush

[57] ABSTRACT

An electrofluid converter converts electrical energy into fluid energy by controlling the linear expansion of a wire that is used as a fluid control valve. Thermal linear expansion of the wire is brought about by passing an electric current through the wire thereby increasing or decreasing the portion of the wire within the fluid flow path. The converter can be used in applications that require converting electrical proportional or digital signals into corresponding fluid signals. The converter signal may be used to control fluid amplifiers or other fluid sensors.

3 Claims, 2 Drawing Figures

ELECTROFLUID CONVERTER

DEDICATORY CLAUSE

The invention described herein may be manufactured, used, and licensed by or for the Government for governmental purposes without the payment to us of any royalties thereon.

SUMMARY OF THE INVENTION

In the electrofluid converter an electrical current is used to stimulate rapid thermal linear expansion or contraction in a thin wire or ribbon conductor in response to a proportional or digital input signal. A leading edge of the ribbon conductor is located tangent to a fluid stream flowing through a passage. Increasing or decreasing electrical current through the ribbon results in a corresponding increase or decrease in blockage of the passage by the leading edge and surface of ribbon. This results in direct modulation of the fluid flow at the electrical input signal rate.

DESCRIPTION OF THE PREFERRED EMBODIMENT

Figure 1:
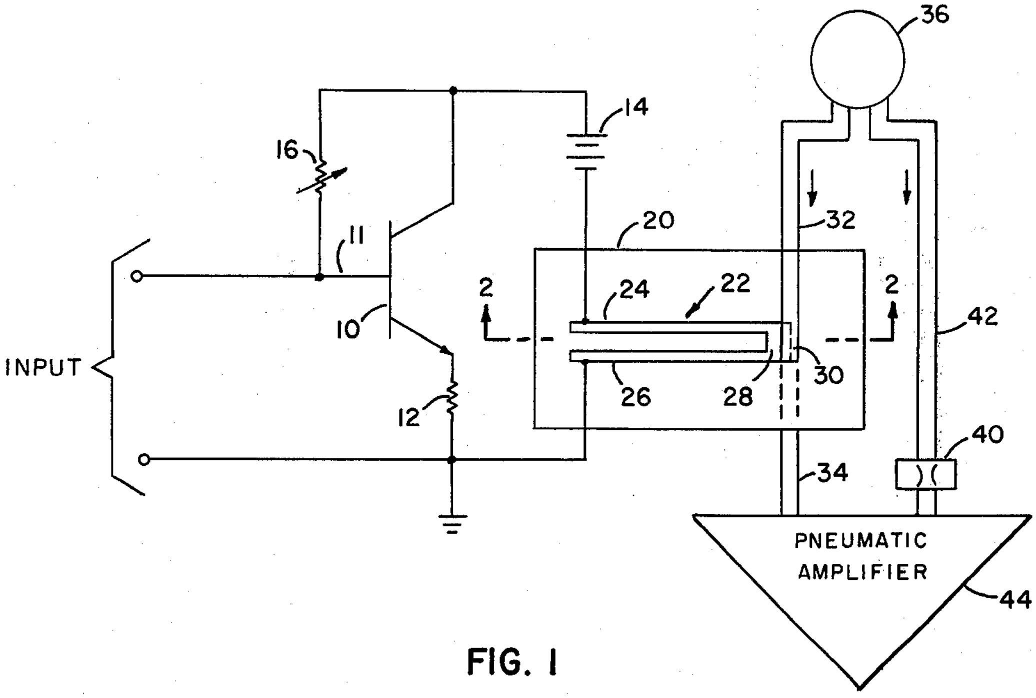
FIG. 1 is a diagrammatic preferred embodment of the electrofluid converter, showing both electrical and fluid flow paths.

The electrofluid converter is an apparatus which uses the thermal linear expansion of an aluminum ribbon to convert electrical energy into a proportional fluid signal. As shown in the FIG. 1 embodiment, the electrofluid converter comprises a transistor 10 driving circuit and an electrofluid converter gate 20 having an aluminum ribbon 22 coupled to the transistor output. A fluidic passageway 30 which is gated by the aluminum ribbon couples the proportional fluid signal to fluidic load circuitry.

Transistor 10 is emitter coupled through a resistor 12 to a system ground. The collector is coupled to one side of a power supply 14 and through a biasing resistor 16 to the base 11. An input signal for driving the transistor is coupled between the base 11 and ground. Aluminum ribbon 22 has respective arms 24 and 26 and body 28 coupled between the other side of battery 14 and ground, with ribbon 22 serving as the electrical load for the system.

Figure 2:
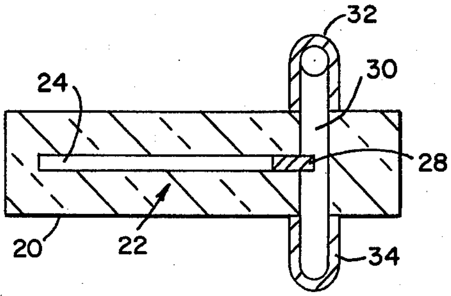
FIG. 2 is a view of the electrofluidic converter gate of FIG. 1 shown along the lines 2—2.

As shown in FIGS. 1 and 2 electrofluid converter gate 20 is a chambered member having a rectangular passageway 30 therethrough for coupling fluid flow from input port 32 through the gate to an output port 34. Aluminum ribbon 22 is positioned within a rectangular slot which joins chamber 30, allowing the controlling edge 28 of ribbon 22 to project into chamber 30 across the path of fluid flow. A fluidic source 36 provides fluid flow through the input port 32. This fluid flow is controlled by the electrofluidic gate 20 in conjunction with current flow through ribbon 22 when an input signal is applied to or varied across transistor 10. In the typical embodiment of FIG. 1, a fixed fluidic resistor 40 is connected into a fluid line 42 between fluidic power source 36 and the input port of a pneumatic amplifier 44. Output port 34 is also connected to amplifier 44. Pressure supply 36 provides fluid energy to the electrofluid converter 20 and to amplifier 44.

In operation transistor 10 is energized and fluid flow through paths 32 and 42 are adjusted by adjusting fluidic resistor 40 to provide equal or balanced inputs to amplifier 44. Bias resistor 16 establishes transistor current flow through resistor 12 and the aluminum ribbon 22 for a predetermined zero reference input signal. With the established bias, current flow through ribbon 22 produces thermal linear expansion in the ribbon that moves the ribbon controlling edge 28 into mid stream of the fluid flow through chamber 30. The ribbon mid stream position and the fixed fluidic resistor 40 value establishes the pneumatic amplifier center frequency for zero input signal. A change in electrical input to transistor 10 will either aid or oppose the transistor bias, thereby proportionally changing the current through the ribbon. The changing current produces linear expansion in the ribbon causing the controlling edge to move further into or out of the fluid flow and thereby modulating the fluid flow in response to the changing input signal to provide fluidic output signals which are sensed in amplifier 44.

Obviously the leading edge 28 of ribbon 22 can provide modulation to the fluid flow or can be positioned to provide a fluidic on or off state in response to a step or digital electrical input signal. Similarly, one or more electrofluidic converters may be used to provide several and varied controlling or interfacing inputs to fluidic systems such as a gyro torquer system. Also, other thermal expansion elements may be continued such as a straight wire, hair spring, or bi-metallic strip. In a typical application aluminum ribbon 22 may be 0.003 inches by 0.036 inches by 2.5 inches long and may be disposed in a slot 0.004 inches by 0.041 inches, with the ribbon leading edge initially projecting into the fluid passageway a predetermined distance depending on the type of operation anticipated. The frequency resonse of the electrofluid converter gate depends on the configuration of control element 22 such as a bimetallic strip or ribbon, and on the material used, such as aluminum. For the aluminum ribbon of the preferred embodiment and a fluid chamber having a cross section of 0.000164 square inches, a frequency response up to 20 Hertz allows the ribbon edge to move from a zero reference point at mid stream of chamber 30 to either completely open or completely close the chamber. This allows rapid and facile converting of the electric input signal to an accurate digital output signal for coupling to a fluidic load circuit.

A fluidic gyro torquer is disclosed in a co-pending application entitled "Proportional/Digital Fluidic Gyro Torquer" by Aubrey Rodgers and Rayburn K. Widner. This fluidic torquer is typical of systems responsive to the electrofluid converter output signal. Both of these systems are disclosed in a US Army Missile Command, Technical Report Number RG-75-44 dated 22 Apr. 1975.

Obviously many modifications and variations of the electrofluid converter are possible in light of the foregoing disclosure. It is therefore understood that within the scope of the appended claims the invention may be practiced otherwise than as specifically described herein.

We claim:

1. An electrofluid converter comprising: an electrofluidic converter gate having a thermal expansion wire therein disposed to receive electrical stimulation for providing thermal expansion therein; a fluidic passageway through said gate; said thermal expansion wire being a single aluminum ribbon having first and second parallel, spaced apart, conductive members terminated at one end in a thin, flat surfaced member having an edge positioned for linear movement across said passageway to restrictively vary the passageway opening in response to thermal expansion; and an electrical power supply and variable coupling means connected respectively to the other ends of said ribbon for stimulating expansion of said ribbon.

2. An electrofluid converter as set forth in claim 1 wherein said variable coupling means is a transistor having the collector connected to said power supply, the emitter resistively coupled to a circuit ground and to the end of the first parallel conductive member of said ribbon, and the base bein coupled to receive input signals for varying the bias of said transistor to allow variable current flow from the power supply through the transistor and ribbon.

3. An electrofluid converter as set forth in claim 2 and further comprising a variable resistance coupled between the collector and base of said transistor for providing feedback bias from said power supply to said base to establish and control a zero reference current flow through said thermionic ribbon.

* * * * *